(12) United States Patent
Vincent et al.

(10) Patent No.: US 12,172,928 B2
(45) Date of Patent: Dec. 24, 2024

(54) METHOD FOR MANUFACTURING CONCRETE ARTICLES AND STRUCTURES

(71) Applicant: GCP Applied Technologies Inc., Cambridge, MA (US)

(72) Inventors: Dany Vincent, Sagy (FR); Klaus-Alexander Rieder, Beverly, MA (US); Stephen P. Klaus, Waban, MA (US); Damian Thomas, Sudbury (GB)

(73) Assignee: GCP APPLIED TECHNOLOGIES INC., Malvern, PA (US)

( * ) Notice: Subject to any disclaimer, the term of this patent is extended or adjusted under 35 U.S.C. 154(b) by 873 days.

(21) Appl. No.: 16/622,095

(22) PCT Filed: Jun. 12, 2018

(86) PCT No.: PCT/EP2018/065550
§ 371 (c)(1),
(2) Date: Dec. 12, 2019

(87) PCT Pub. No.: WO2018/229074
PCT Pub. Date: Dec. 20, 2018

(65) Prior Publication Data
US 2021/0188709 A1 Jun. 24, 2021

(30) Foreign Application Priority Data
Jun. 13, 2017 (EP) ..................................... 17175822

(51) Int. Cl.
*C04B 28/06* (2006.01)
*B28B 1/30* (2006.01)
(Continued)

(52) U.S. Cl.
CPC ................ *C04B 28/06* (2013.01); *B28B 1/30* (2013.01); *B28B 7/388* (2013.01); *C04B 14/06* (2013.01);
(Continued)

(58) Field of Classification Search
None
See application file for complete search history.

(56) References Cited

U.S. PATENT DOCUMENTS

| 4,036,839 A | 7/1977 | Plunguian et al. |
| 4,098,755 A | 7/1978 | Plunguian et al. |

(Continued)

FOREIGN PATENT DOCUMENTS

| CN | 1118034 | 3/1996 |
| CN | 102817436 | 12/2012 |

(Continued)

OTHER PUBLICATIONS

Machine English translation of FR2795359, Accessed Jan. 23, 2023 (Year: 2000).*

(Continued)

*Primary Examiner* — S. Behrooz Ghorishi
*Assistant Examiner* — Adrianna Konves
(74) *Attorney, Agent, or Firm* — Armstrong Teasdale LLP

(57) ABSTRACT

A method for manufacturing a concrete article is disclosed. The method comprises coating a mould or formwork with a release agent; spraying a mortar onto the mould or formwork, thereby forming a layer of mortar; casting concrete into the mould or formwork and onto the layer of mortar; and allowing the concrete to hydrate and harden in the mould or formwork, whereby a concrete article having a mortar skin layer is provided. The invention also provides concrete articles made by the described methods, and concrete structures which comprise the concrete articles. Concrete articles having the mortar skins can be made to have a relatively uniform outward appearance, even if the concrete cast behind the mortar skins may be different, in composition or appearance. Pigments or colorants and other expensive admixtures can be used in the mortar skin composition (Continued)

(a)

(b)

(c)

to greater visual effect, since the use of the mortar skin is less in overall volume compared to the concrete articles as a whole.

17 Claims, 5 Drawing Sheets

(51) Int. Cl.
    *B28B 7/38* (2006.01)
    *C04B 14/06* (2006.01)
    *C04B 14/28* (2006.01)
    *C04B 14/30* (2006.01)
    *C04B 24/24* (2006.01)
    *B28B 11/04* (2006.01)
    *B28B 19/00* (2006.01)
    *C04B 103/54* (2006.01)
    *C04B 111/00* (2006.01)

(52) U.S. Cl.
    CPC ............ *C04B 14/28* (2013.01); *C04B 14/305* (2013.01); *C04B 24/24* (2013.01); *B28B 11/048* (2013.01); *B28B 19/0015* (2013.01); *C04B 2103/54* (2013.01); *C04B 2111/00163* (2013.01)

(56) References Cited

U.S. PATENT DOCUMENTS

| | | | |
|---|---|---|---|
| 4,205,040 | A | 5/1980 | Aoyama et al. |
| 5,348,993 | A * | 9/1994 | Daeumer ................ C04B 24/26 524/44 |
| 8,987,356 | B1 | 3/2015 | Owen |
| 9,045,368 | B1 | 6/2015 | Owen |
| 2001/0045685 | A1 | 1/2001 | Bowe et al. |
| 2007/0096353 | A1 | 5/2007 | Gordon et al. |
| 2007/0164484 | A1 | 7/2007 | Piccolo |
| 2007/0213480 | A1 | 9/2007 | Cho et al. |
| 2009/0188670 | A1 | 7/2009 | Xu et al. |
| 2014/0374948 | A1 | 12/2014 | Vincent et al. |
| 2014/0374949 | A1 | 12/2014 | Vincent et al. |

FOREIGN PATENT DOCUMENTS

| | | | | |
|---|---|---|---|---|
| CN | 204080842 | | 1/2015 | |
| CN | 104496392 | | 4/2015 | |
| DE | 4418807 | A1 * | 12/1995 | ............ B28B 7/384 |
| EP | 2157070 | | 2/2010 | |
| FR | 2795359 | | 12/2000 | |
| JP | 5709234 | | 12/1982 | |
| JP | 03122040 | | 5/1991 | |
| JP | 2003301134 | A * | 10/2003 | |
| KR | 20050080038 | A * | 8/2005 | |
| KR | 101255493 | | 4/2013 | |
| WO | 2004074204 | | 9/2004 | |
| WO | 2008003448 | | 1/2008 | |
| WO | 2013148116 | | 4/2015 | |

OTHER PUBLICATIONS

Machine English translation of JP2003301134, Accessed Jan. 23, 2023 (Year: 2003).*
Machine English translation of KR20050080038, Accessed Jan. 23, 2023 (Year: 2005).*
Bridger, Shotcrete Essentials, https://www.heavyequipmentguide.ca/article/22264/shotcrete-essentials, Published Dec. 14, 2015, Accessed Oct. 12, 2023 (Year: 2015).*
Machine English translation of DE-4418807-A1, Accessed Feb. 29, 2024 (Year: 1995).*
Clay Product-Faced Precast Concrete, PCI designer'snotebook, prior to 2017, pp. 50-70.
Lattice girder slabs, http://www.concrete.org.uk/fingertips-print.asp?docid=310; Mar. 2016, 1 page.
Gedeon, Standard Practice for Shotcrete, Introduction to Shotcrete Applications, Jan. 31, 1993, 49 pages.
Mixes and Materials For GFRC, Concrete Network.com, http://www.concretenetwork.com/glass-fiber-reinforced-concrete/mix.html, 2016, 2 pages.
Rosenberger, European Search Report for EP17175822, Dated Nov. 21, 2017, 6 pages.
Rosenberger, International Search Report for PCT/EP2018/065550, Dated Sep. 5, 2018, 4 pages.

* cited by examiner (a)

(b)

(c)

(a)

(b)

(c)

(a)

(b)

(c)

(d)

(a)

(b)

(c)

(d)

(e)

METHOD FOR MANUFACTURING CONCRETE ARTICLES AND STRUCTURES

FIELD OF THE INVENTION

The present invention relates to a method for manufacturing a concrete article or structure having a mortar skin, the concrete articles and structures made thereby, as well as mortar skin coating compositions for use in making concrete articles or structures having controlled outer surface appearance.

BACKGROUND OF THE INVENTION

Concrete articles such as panels, blocks, paver units, concrete masonry units (CMU), and concrete structures such as foundations, walls, and tunnels are made by casting concrete into a mould or into a formwork. It is desirable for the surface finish of concrete articles to be uniform such that a pleasing appearance is provided when the concrete articles are incorporated into a building or other structure. In practice, it is often difficult to achieve a uniform surface finish when preparing large numbers of concrete articles or when preparing a single large article, as there can be variations in surface finishes across a single article, and even greater variation between articles. The appearance of the concrete articles typically varies throughout the production process, e.g. the colour or texture of panels or blocks from the start of a production run differ significantly from the colour or texture of panels or blocks made at the end of the production run.

Careful control of the production process can help to improve the uniformity of appearance of the concrete articles. In many precast concrete processes, a layered approach is adopted whereby a high-quality concrete known as a face mix is cast onto the bottom of the mould or formwork and a second layer of lower-quality concrete is cast onto the face mix. The face mix layer is usually at least 5cm thick because the second layer is cast onto the wet face mix layer and a thinner face mix layer could be damaged by application of the second layer of concrete. Casting onto the wet layer is necessary because allowing the face mix layer to cure would significantly increase the production time. The high-quality concrete in the face mix provides a better appearance but substantially increases the cost of the concrete article.

Another approach that is adopted to improve the appearance of concrete articles is to apply a coating to the concrete articles after they have been produced. For example, Pieri® Prelor® HDL surface coating product can be used to apply a thin mineral layer upon the surface of concrete to provide a smooth even surface. Such a product provides a uniform appearance; but the present inventors believe it is desirable to provide a uniform appearance without the need for an additional coating step.

The present inventors seek to provide an efficient method for manufacturing concrete articles wherein the appearance of the concrete articles is regular and uniform such that there is no need for a subsequent coating step required to improve the appearance of the articles. Desirably the method will not cost more, nor will require longer application times, compared to known methods.

SUMMARY OF THE INVENTION

Accordingly, the present invention provides a method for manufacturing a concrete article or structure, comprising:

(a) coating a mould or formwork with a release agent;
(b) dry spraying a mortar onto the mould or formwork, thereby forming a layer of mortar (which will act as an outer "skin layer" of the resultant concrete article or structure);
(c) casting concrete into the mould or formwork and onto the layer of mortar; and
(d) allowing the concrete to hydrate and harden in the mould or formwork (and thus bond to the dry-sprayed mortar skin layer).

The present invention further provides a mortar skin coating composition for use in practicing the method of the invention.

The present invention further provides a concrete article or structure prepared by the method of the invention. For example, concrete blocks or slabs, made by first applying the mortar skin layer composition into moulds, can be assembled into larger structures such as walls. As another example, concrete structures, such as foundations or entire walls, can be made by first applying the mortar skin layer composition onto a formwork (which is previously installed skin-outward against a wall, excavation, or other substrate, or which is subsequently installed skin-inward to form a cavity next to a wall, excavation, or other substrate), casting concrete into the cavity defined between the formwork and substrate, and thereafter removing the formwork to expose the mortar skin.

The inventors have managed to prepare concrete articles having a pleasing uniform appearance by dry spraying a layer of mortar onto a mould or formwork before the concrete is cast into (or against) the mould or formwork. The dry-sprayed layer effectively forms a skin on the surface of the concrete article, and the skin has a uniform appearance. The method can be quick because the dry spraying technique can provide a thin and quick-drying layer; and the method does not need to be costly because the majority of the concrete in the concrete article is standard concrete; as the present inventors believe that only a small quantity of mortar needs to be used to form the skin or outer coating layer. Dry spraying is a particularly appropriate technique for quick-drying mortars as there is a reduced risk of blocking pipes with the mortar.

DETAILED DESCRIPTION OF THE INVENTION

Figure 1:
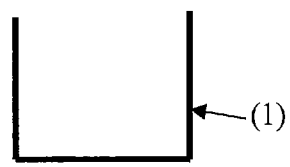
FIG. 1 shows a method for manufacturing a concrete article according to the prior art.
Figure 1:
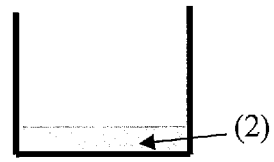
Figure 1:

The term "mould" refers to forms or shaped devices that function to shape concrete into panels, blocks, flags, paver units, or other construction units; while "formwork" is essentially a large mould, assembled using wood boards and panels for example, designed for forming larger construction structures such as foundations, walls, tunnels, and the like. The terms "articles" and "structures" can be used interchangeably to refer to anything made using the mortar skin layer technique disclosed herein, regardless of size.

The term "cement" as used herein shall mean and refer to pastes, mortars, and concrete compositions, which are based on Ordinary Portland Cement ("OPC") as a hydratable binder. Cement is considered to be hydratable, because these are mixed with water to initiate setting of the material into a hardened article or structure, such as a wall, panel, or block. OPC-based cements or cementitious materials employed in the present invention may include supplementary cementitious materials such as limestone, hydrated lime, fly ash, granulated blast furnace slag, pozzolans, silica fume, or other materials commonly included to substitute for a portion of the OPC. The terms "pastes", "mortar" and "concrete" are terms of art: "pastes" are mixtures composed of the OPC-based binder and water; "mortars" are pastes additionally including fine aggregate (e.g., sand); and "concretes" are mortars additionally including coarse aggregate (e.g., crushed gravel, stone). Fine aggregate is typically defined as aggregate wherein the aggregate will pass a 10 mm sieve and is almost entirely retained at 5 mm sieve.

For purposes of the present invention, fine aggregate should pass through (100%) a 10 mm sieve but be retained on a 5 mm sieve.

The term "dry spraying" is used to describe a process wherein a powder is supplied to a nozzle, and is mixed with water in the nozzle. In a typical dry spray process, the powder components of a mortar (i.e. a mixture of cement and fine aggregate), which may contain a dry accelerator, are introduced into a high velocity air stream and conveyed through pipes to a nozzle. At the nozzle, a finely atomised spray of water, which may contain accelerator, such as aluminium sulfate or aluminium hydrates, are added to the stream of powder to hydrate the cement and provide the right consistency for the mortar. A stream of mortar can be projected from the nozzle at high velocity. Dry spraying can be contrasted with wet spray processes in which cement and aggregate are mixed with water prior to being pumped through a pipe to a discharge nozzle.

The terms "skin" or "face" may be used alternatively herein to refer to the mortar coating layer composition, which is applied onto moulds or formwork to provide an outer surface for concrete articles and structures.

The concrete articles formed by the present invention may be precast concrete articles such as panels, blocks, paver units, stairs, tiles, flags, and concrete masonry units (CMU). Concrete structures formed by the present invention may include foundations, walls, and tunnels. Preferably, the concrete articles are precast concrete articles such as panels, blocks, paver units or concrete masonry units (CMU). Most preferred are precast concrete panels. The mortar skin coating technique disclosed herein can generally be used for any process wherein concrete is poured, cast, or sprayed into a mould or against formwork, regardless of whether the process is an interior or exterior application.

Thus, exemplary methods of the invention include applying the mortar skin composition into a mould and casting concrete against the mortar skin and thereafter de-moulding the concrete article; or, as another example, casting or spraying the mortar skin composition against a formwork which is installed (or even before it the formwork installed) adjacent a wall, foundation, excavation, or other substrate, casting or spraying concrete into the cavity defined by formwork and the wall or other substrate), and then removing the formwork after the concrete is hardened to expose the mortar skin layer.

In step (a) of the invention, the mould or formwork is first coated with a release agent. Suitable release agents are known to the skilled person.

Release agents believed to be suitable for the present invention can be chosen among the conventional following families: mineral oil based, vegetable oil based, or mixture of them, with or without solvent as thinner. Also suitable are emulsions of oil (i.e., oil in water) including vegetable oil, mineral oil, or mixtures thereof, as well as water-based release agents. Special release agents such as vegetable oil based emulsions or waxes can be used to provide special advantages.

Although water based release agents currently do not have a good reputation in terms of producing high quality finishes, they can also be used for this invention.

In step (b), a mortar is dry sprayed onto the mould or formwork, thereby forming a layer of mortar. The term "dry spray(ed)" as used herein refers to a process whereby a dry powder cementitious binder is conveyed through a hose to a spray nozzle, where water is introduced into the dry powder before it is ejected from the nozzle, whereupon hardening is initiated.

The present inventors realize that while mortar can be wet sprayed (whereby the mortar is mixed with some water prior to being conveyed through the hose towards the nozzle where a set accelerator is added at the nozzle before the mortar is sprayed onto a mould or formwork), the inventors prefer the dry spray ,process because it avoids the need to clean out the mixer, hoses, and spraying equipment during downtime. This includes avoiding cleaning during long breaks, during assembly of moulds and formwork, preparation for overnight postponement of operations, and other intervals.

The sprayed mortar will comprise water, cement and fine aggregate. The amount of water in the mortar is suitably from 5 to 50 wt % (based upon the weight of the mortar), preferably from 8 to 40 wt %, more preferably from 10 to 30 wt %, and most preferably from 12 to 25 wt %, to ensure correct setting times, good mechanical and durability performances as well as a providing a nice appearance to the surface. During dry spraying, the water is mixed with the dry components of the mortar in the nozzle of the dry spraying apparatus.

The amount of cement in the mortar is suitably from 5 to 75 wt % based upon the weight of the mortar, preferably from 15 to 40 wt %, and, more preferably, from 25 to 35 wt %, in order to ensure good performance in terms of durability and mechanical resistance.

The cement binder comprises Ordinary Portland Cement (OPC), but may comprise other components typically found in commercial cement, e.g. limestone, hydrated lime, fly ash, granulated blast furnace slag, pozzolan, silica fume, or other materials commonly included to substitute for a portion of the OPC or added in addition to the cement.

As a rapid setting mortar is preferred, a blend of OPC and alumina cement, or a blend of OPC and calcium sulfate aluminate cement ("CSA"), is preferred.

The weight ratio between OPC and alumina cement or sulfate aluminate cement (CSA) may respectively vary in comparative amounts from 95/5 to 5/95, more preferably from 80/20 to 70/30, to achieve a very fast setting mortar.

Both OPC and alumina cement or CSA can be white or grey, depending on the required appearance of the concrete skin.

The amount of fine aggregate in the mortar (skin composition) is suitably from 40 to 95 wt %, based upon the weight of the mortar, preferably from 50 to 85 wt %, and more preferably from 60 to 75 wt %. The fine-aggregate is preferably sand, but a non-sand fine aggregate is also suitable, depending on final application. Fillers such as limestone powder, kaolin clays, calcium carbonate, talc, and other conventional filler materials might be used, as their small particle size may facilitate the achievement of color uniformity in the mortar skin and the minimization or avoidance of shrinkage, as well as to achieve mortar skin surface hardness.

The mortar (skin) composition may additionally comprise a pigment or pigments to change the colour of the outward surface appearance of the concrete article or make it more uniform in outward appearance. Suitable pigments include iron oxides, titanium dioxide and chromium oxide and other pigments commonly used in concrete industry. The pigment amount is generally a ratio based on the amount of cement in the mix design and may vary from 0.1% to 10% and preferably about 0.1% to 6% based on weight of the cement.

The mortar may additionally comprise a dried polymer emulsion. Suitable materials include the Vinnapas® dried polymer emulsions available from Wacker Chemie.

All dried emulsions can be chosen among the following chemicals, such as acrylic, methacrylic, carboxylic, acetic, latex (rubber) and other polymers, including vinyl ester of versatic acid, and styrene acrylic, and mixtures thereof.

The quality of the dried emulsion is linked to the desired performances. These materials can improve the weathering performance and/or the durability of the concrete article. The amount of dried polymer emulsion in the mortar is suitably from 0.1 to 10 wt %, based upon the weight of the mortar (i.e., cement, fine aggregate, and water), preferably from 0.5 to 5 wt % and more preferably from 0.8 to 3 wt %.

The dried emulsions are also known as redispersable powders or redispersable emulsions. Redispersable in this context means that the emulsion can be rebuilt by mixing the powder with water.

Other additives can be included into the mortar as skin reflective, phosphorescent, luminescent, water repellents, oil repellents (pollution dust reduction), stain resistance improvers, anti-graffiti, anti-efflorescence, coloured plastic beds, electricity conductors, $NO_x$ reduction agents, photochrome pigments, thermochrome pigments, UV absorber, fluorescent optical brightener.

Because the mortar composition is used to prepare a thin skin or face layer, it is possible to incorporate comparatively high levels of costly additives in the mortar because only a small quantity of the mortar will be used, compared to the concrete quantity in the article or structure. For example, the mortar skin composition may comprise special very expensive pigments, such a fluorescent optical brightener. Such an expensive pigment normally is not used in a 5 cm thick skin or face mix due to very high cost, whereas the use of even the most expensive pigments will be facilitated by the present invention since only a very thin layer of the face mix is applied to the mould, and hence a far lower amount of pigment is required to achieve the desired aesthetic effect.

Very often costly additives are not used at the very efficient level in traditional concretes as they are expensive and in addition they have to be incorporated in the full mass of the exposed face or into the full mass of concrete if there is no way to make a face mix and a plain mix. Thanks to the low thickness of the coat in this invention it is possible to put high amount of active ingredients at very low cost and so ensuring full performance of the concrete skin which is the only part exposed to weathering and other exposures.

Preferably, the mortar skin composition should not include glass fibers. Glass fibers are used in glass fiber reinforced concrete (GFRC) to improve the strength of the concrete. Such fibers are not required in the mortar used for dry spraying as contemplated within the present invention, because strength of the concrete article is predominantly determined by the concrete used in the casting step rather than the mortar skin composition of the dry spraying step. However, very fine polyolefin, nylon, PVA, acrylamide, polyacrylonitrile (PAN), or cellulose based fibers could be used to reinforce the mortar, for example, in panel corners.

Suitable apparatus for the dry spraying step typically comprises a hopper into which the dry components of the mortar composition can be fed. The dry components suitably drop by gravity onto a revolving barrel and then may be blown by compressed air along a pipe into the nozzle. Water, with or without an accelerator, is suitably injected into the nozzle. Preferably, the dry spraying step may be used to prepare a thin (skin or face) layer of mortar, e.g. less than 10 mm. The diameter of the pipes for supplying the dry components in standard apparatus is typically from 40 to 60 mm. Such apparatus can be used in the method of the present invention, but to prepare a thin (skin) layer, it may be necessary to use dry spraying apparatus wherein the diameter of the pipes is reduced compared to standard apparatus. Preferably, the diameter of the dry component supply pipe is less than 40 mm, more preferably less than 30 mm, and most it is preferably less than 25 mm. Thinner pipes allow for slower and more controlled application of the mortar composition, thereby allowing a thin (skin) layer of mortar to be sprayed. Preferably, the diameter of the dry component supply pipe is less than 40 mm, and more preferably less than 32 mm. A supply pipe having such a diameter is required to make a thin coat of 0.1-10 mm, preferably to 0.5 to 6 mm, and more preferably to 0.75 to 4 mm.

The mortar is dry sprayed onto the mould or formwork. The mortar may be sprayed onto only part of the mould or formwork, e.g. providing a layer only on the base of the mould or formwork. However, in a preferred embodiment the mortar is sprayed onto substantially the entire interior surface of the mould or formwork, e.g. the mortar layer covers at least 80% of the internal area of the mould or formwork, more preferably at least 90%, and most preferably at least 95%. It is preferred that the mortar layer provides a skin that covers all surfaces of the concrete article that are visible when in use.

The mean average thickness of the (skin or face) mortar layer is suitably from 1 to 10 mm, preferably from 1 to 5 mm, and most preferably from 1 to 3 mm. The preferred thickness is determined by balancing the various factors of mortar component cost, the diameter of the aggregate, the desired speed of production, and other factors such as the resultant uniformity and/or homogeneity of the outer surface and hence appearance of the mortar skin.

In further exemplary embodiments, the density of the mortar layer should have as small a percentage of air voids as possible. The air void content can be measured by applying a current through the mortar layer and measuring the resistance of the mortar. Surface resistivity can be measured using the AASHTO T 358-17 standard (Standard Method of Test for Surface Resistivity Indication of Concrete's Ability to Resist Chloride Ion Penetration). This standard was developed by the American Association of State and Highway Transportation Officials. This test method will allow the user to measure the surface resistivity of concrete, which is directly correlated to the permeability of the concrete: the higher the surface resistivity of the concrete the lower the permeability. Measured on a 100 by 200 mm cylinder, it is preferred that the surface resistivity of mortar skin layers of the invention should exceed 20 kOhm-cm; more preferably, mortar skin surface resistivity should exceed 40 kOhm-cm, and, most preferably, should exceed 200 kOhm-cm.

Suitably the mortar skin layer is not subjected to vibration during application or hardening. Vibration is often used when casting concrete to compact it and to achieve maximum possible density, but the use of vibratory operations can lead to irregularities in the surface finish. Not subjecting the mortar skin composition to vibration should help to ensure a uniform outer finish and appearance.

The mortar skin layer is suitably allowed to cure and to harden before concrete is cast against it in step (c). The mortar layer preferably has fast-curing properties, such that curing can take place in less than 30 minutes, more preferably in less than 10 minutes and most preferably in less than 5 minutes. Casting of the plain concrete might start as soon as the mortar skin composition has set and is able to resist concrete flow. This point is conventionally determined in the field by testing resistance to depression of the thumb into the surface.

In step (c), concrete is cast into the mould or formwork and onto the (skin) layer of mortar.

The concrete comprises water, cement, fine aggregate (e.g., sand) and coarse aggregate (e.g., crushed gravel, stones). The concrete mix is preferably a conventional mix used to prepare the concrete articles.

The plain concrete mix design could be a traditional concrete mix fulfilling the design compressive strength requirements, self-compacting concrete, lightweight concrete, concrete with lower thermal or electrical conductivity, or fiber reinforced concrete, steel or GFRP (glass fiber reinforced plastics) reinforced concrete following the rules of the art.

Once the skin mortar is set, traditional methods of casting concrete panels or casting concrete in formworks, such as use of reinforcement or insulation materials, can proceed normally, as if the mortar skin technique of the invention was not used.

The concrete preferably does not need to include pigments, colorants, or other additives associated with obtaining surface finishes, because the appearance of the mortar, not of the concrete, will determine the external appearance of the concrete article. Incorporating pigments and other decorative additives in the concrete is costly and unnecessary.

The casting step is preferably carried out using conventional apparatus and techniques. For example, once the mortar skin is hardened, concrete then can be pumped or trowelled or dumped into the formwork.

As part of the casting step, the concrete is preferably subjected to vibration. Vibration compacts the concrete and helps to achieve the maximum possible density. Curing the mortar skin layer before the casting of the concrete ensures that vibration will not affect the appearance of the surface of the concrete article.

In step (d), the concrete is allowed to hydrate and harden in the mould or formwork. Suitably this step could be adjusted depending on final manufacturer needs, from 10 minutes to 5 hours and more preferably from 30 minutes to 5 hours in normal casting conditions.

Preferably, the method further comprises a step of removing the mould or formwork from the concrete article. This can be done the same way as traditional concrete release.

The present invention further provides a composition for use in the method of the invention.

Exemplary admixtures that are suitable for incorporation into the mortar skin composition for use in the dry spraying step are described below.

Exemplary water repellent admixtures include fatty acid derivatives, silicone derivatives, organofluoride derivatives, silanes, siloxanes, particulated polymers, and particulated copolymers; and such water repellent admixtures may be used in the composition for use in the dry spraying step in customary amounts, such as 0.1 to 10% by weight based on cement in the composition.

Exemplary efflorescence control admixtures (ECA) include fatty acid derivatives, stearate containing materials (e.g. calcium stearate), mineral oil, vegetable oils, paraffin waxes, long chain fatty acids, hydrocarbon resins and bitumen, saponified tall oil fatty acid, styrene butadiene, acrylic latex and polyepoxy; and such ECAs may be used in the composition for use in the dry spraying step in customary amounts, such as 0.1 to 10% by weight based on cement in the composition.

Exemplary water reducing admixtures e.g., high range water reducing admixtures or superplasticizers such as polycarboxylate comb polymers, lignosulfonates, naphthalene sulfonates, phosphonates, melamine sulfonates, and a mixture of any of the foregoing; and such water reducing admixtures may be used in the composition for use in the dry spraying step in customary amounts, such as 0.1 to 10% by weight based on cement in the composition.

Exemplary set accelerating admixtures e.g., calcium nitrite, calcium nitrate, fluoro aluminates and aluminium sulfate, calcined aluminium sulfate, hydrocalcium silicate or mixtures thereof), but also lithium salts; and such set accelerating admixtures may be used in the composition for use in the dry spraying step in customary amounts, such as 0.1 to 5% by weight based on cement in the composition.

Exemplary strength enhancing admixtures include dried polymer emulsions such as acrylics, Vinyl versatates, pvOH, poly(hydroxyalkylated) polyethyleneamine or a poly(hydroxyalkylated)polyethyleneimine or mixtures thereof, poly(hydroxyalkylated)polyamine, alkoxylated poly(hydroxyalkylated)polyamine hydroxyalkylated derivatives of the compounds hydrazine, 1, 2, diaminopropane and polyglycoldiamine and mixtures thereof; and such strength enhancing admixtures may be used in the composition for use in the dry spraying step in customary amounts, such as 0.1 to 20% by weight based on cement in the composition.

Exemplary crack control admixtures include polyglycols, polypropylene and polyethylene glycols, glycol ether derivatives, alkylamine compounds, wherein the alkyl group is butylmethyl or diethylmethyl, oxyalkylamine or alkanolamine compounds, wherein the compound is 2-butylaminoethanol, 3-ethoxypropylamine or 3-propoxypropylamine; and such crack control admixtures may be used in the composition for use in the dry spraying step in customary amounts, such as 0.1 to 5% by weight based on cement in the composition.

Exemplary shrinkage reducing admixtures include polyglycols, polypropylene and polyethylene glycols, glycol ether derivatives, alkylamine compounds, wherein the alkyl group is butylmethyl or diethylmethyl, oxyalkylamine or alkanolamine compounds, wherein the compound is 2-butylaminoethanol, 3-ethoxypropylamine or 3-propoxypropylamine; and such shrinkage reducing admixtures may be used in the composition for use in the dry spraying step in customary amounts, such as 0.1% to 10% by weight based on cement of the composition.

Exemplary expansive agents e.g., alkaline earth metal oxides such as calcium oxide, magnesium oxide, and derivatives thereof; include cement type K, partially hydrated high alumina cement powder; and such expansive agents may be used in the composition for use in the dry spraying step in customary amounts, such as 0.01% to 10% by weight based on cement in the composition.

Exemplary pigments include natural and artificial pigments, iron oxides, titanium dioxides, chromium dioxides, Spinel pigments, Others, Sienna, Umbers; and such pigments may be used in the composition for use in the dry spraying step in customary amounts, such as 0.1 to 10% by weight based on cement in the composition.

FIG. 1 shows a method for manufacturing a concrete article according to the prior art. In step (a), a mould (1) is coated with a release agent. In step (b), a face mix (2) is cast into the mould. The face mix (2) is about 5-10 cm thick. Before the face mix dries, in step (c), conventional concrete (3) is cast onto the face mix (2).

Figure 2:
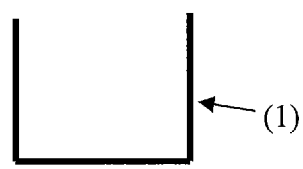
FIG. 2 shows a method for manufacturing a concrete article according to the invention.
Figure 2:
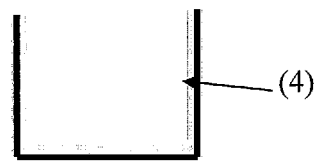
Figure 2:

FIG. 2 shows a method for manufacturing a concrete article according to an embodiment of the invention. In step (a), a mould (1) is coated with a release agent. In step (b), a mortar layer (4) is dry sprayed onto the base and walls of the mould (1). The mortar layer (4) is typically between 0.2 and 0.7 cm thick. After the mortar layer (4) has cured, in step (c) a conventional concrete mix (3) is cast onto the mortar layer (4).

Figure 3:
FIG. 3 shows a method for manufacturing a concrete panel according to the prior art.
Figure 3:
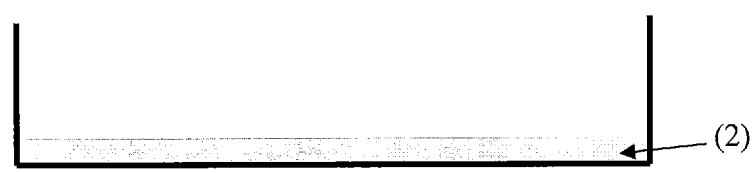
Figure 3:
Figure 3:
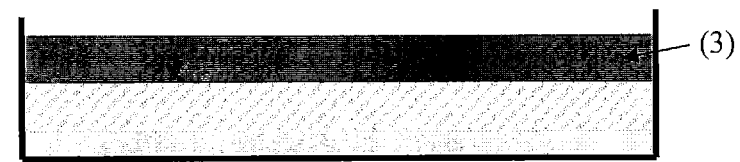

FIG. 3 shows a method for manufacturing a concrete panel according to the prior art. In step (a), a mould (1) is coated with a release agent. In step (b), a face mix (2) is cast into the mould. The face mix (2) is about 5-10cm thick. Before the face mix dries, in step (c), a concrete mix containing insulation (4) is cast onto the face mix (2). In step (d), a layer of conventional concrete (3) is cast onto the insulation layer (4). The insulation layer is about 10 cm thick and the conventional concrete is typically from 15-70 cm.

Figure 4:
FIG. 4 shows a method for manufacturing a concrete panel according to the invention.
Figure 4:
Figure 4:
Figure 4:
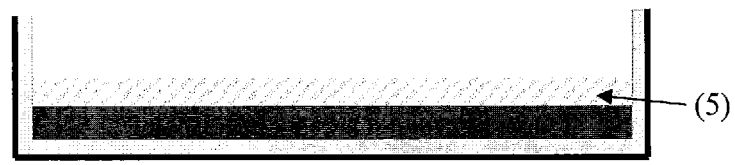
Figure 4:

FIG. 4 shows a method for manufacturing a concrete panel according to an embodiment of the invention. In step (a), a mould (1) is coated with a release agent. In step (b), a mortar layer (4) is dry sprayed onto the base and walls of the mould (1). The mortar layer (4) is typically between 0.2 and 0.7 cm thick. After the mortar layer (4) has cured, in step (c) a conventional concrete mix (3) is cast onto the mortar layer 4). This concrete layer is typically 5-10 cm thick. In step (d), a concrete mix containing insulation (5) is cast onto the conventional concrete (3). The insulation layer is about 10 cm thick. In step (e) another layer of conventional concrete (3) is cast onto the insulation layer (5). This concrete layer is typically 10 -70 cm thick.

Figure 5:
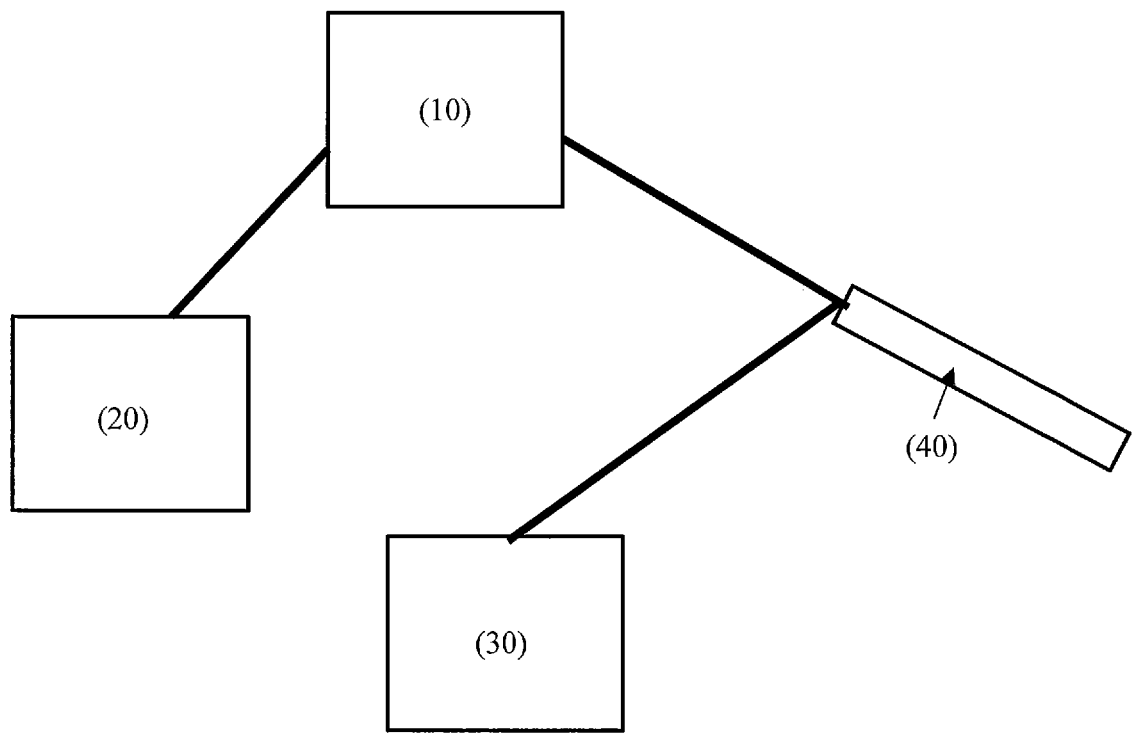
FIG. 5 shows a dry spray apparatus suitable for use in the method according to the invention.

FIG. 5 shows a dry spray apparatus suitable for use in the method according to the invention. An air compressor (20) produces a high velocity air stream, which is supplied to a projection machine (10). The dry mix composition is added to the projection machine (10) and is then conveyed through pipes to the nozzle (40). Water is provided by a water reserve (30) through pipes to the nozzle (40). In the nozzle (40), water is mixed with the stream of dry mix composition. A stream of mortar can be projected from the nozzle (40) at high velocity.

In a first exemplary aspect, the invention provides a method for manufacturing a concrete article comprising: (a) coating a mould or formwork with a releae agent; (b) dry spraying a mortar onto the mould or formwork, thereby forming a layer of mortar; (c) casting concrete into the mould or formwork and onto the layer of mortar; and (d) allowing the concrete to hydrate and harden in the mould or formwork.

In a second exemplary aspect, the mean average thickness of the mortar layer is from 1 to 10 mm.

In a third exemplary aspect, in accordance with any of the first to second aspects above, the mortar is prepared by combining a dry mix composition with water, wherein the dry mix composition comprises: 5 to 50 wt % of cement based upon the weight of the mortar; and 40 to 95 wt % of fine aggregate, based upon the weight of the mortar.

In a fourth exemplary aspect, in accordance with any of the first to third aspects above, the dry mortar mix composition comprises at least one admixture chosen from water reducing admixtures, set accelerating admixtures, set retarding admixtures, water repellent admixtures, air detraining admixtures, shrinkage reducing admixtures, crack reducing admixtures, efflorescence control admixtures, colorants, pigments, dried polymer emulsions, oil repellent agents, stain resistance improvers, anti-graffiti agents, electricity conductors, NOX reducers, photochrome pigments, thermochrome pigments, UV absorbers, fluorescent optical brighteners, and mixtures of any of the foregoing.

In a fifth exemplary aspect, in accordance with any of the first to fourth aspects above, the mortar mix composition comprises cement, a fine aggregate, and water; and admixtures comprising at least one water reducing admixture, at least one air detraining admixture, at least one set accelerating admixture, at least one water repellent admixture. In still further exemplary embodiments, the mortar (skin) composition will comprise chemical admixtures, which are absent from the concrete composition that is applied against the mortar skin composition.

In a sixth exemplary aspect, in accordance with any of the first to fifth aspects above, the method of the invention comprises assembling into a structure a plurality of concrete articles made from any of the methods described in the first through fifth aspects above, wherein the article is a wall, foundation, tunnel lining, deck surface, foundation, bridge deck, or combination thereof.

In seventh exemplary aspect, in accordance with any of the first to sixth aspects above, the mortar skin can have patterns or decorations. For example, the patterns or decorations may be applied using blocking techniques. For example, the method may comprise (i) applying a release paper having a pattern to a mould or formwork, (ii) applying a first mortar skin coating composition onto the mould or formwork having the pattern release paper; (iii) removing the pattern release paper from the mould or formwork; and (iv) applying a second mortar skin coating composition (having e. g., different, darker, or lighter colorant or pigment compared to the first mortar skin coating composition) to the mould or formwork surface from which the pattern release paper was removed; and (v) applying concrete onto the first and second mortar coating compositions. Variations of this method can include use of further pattern release papers and further mortar skin coating compositions to create increasingly complex designs.

In an eighth exemplary aspect, the invention provides a concrete article prepared by the method according to any one of first to seventh aspects above.

In a ninth exemplary aspect, the invention provides a concrete structure made in accordance to the any of the first through eighth aspects above. The structure may be made by applying a mortar skin composition to a formwork, and thereafter casting, spraying, or applying concrete to the mortar skin composition (before or after attaching the formwork to a wall, excavation, or other substrate to define a cavity into which concrete is poured or sprayed), and thereafter removing the formwork to expose the mortar skin layer. Alternatively, the structure (e.g., wall, floor) may be made by assembling together concrete articles (e.g., panels, tiles, pavers, flags, etc.) made by the above mortar skin coating technique.

In a tenth exemplary aspect, the invention provides a mortar skin coating composition, suitable for combining with water to form a mortar skin on a mould or formwork upon which a a concrete article or structure is cast, sprayed, or applied, the mortar skin composition comprising: 5 to 50 wt % of cement based upon the weight of the mortar; 40 to 95 wt % of fine aggregate, based upon the weight of the mortar; a pigment; and a dried polymer emulsion. In further exemplary embodiments, the mortar skin coating composition may comprise any or any combination of chemical admixtures as previously described hereinabove.

The following non-limiting Examples are further illustrative of the invention.

EXAMPLE 1

This exemplary formulation can be used to provide the dry components for the mortar (skin) layer: Portland cement CEM I (30 wt %); alumina cement (2 wt %); dried polymer emulsion (2 wt %); sand, 0-0.5 mm (56 wt %), limestone filler, average diameter 15 µm (10 wt %). Water (20 wt %, based upon the weight of the dry components) is added to the dry components in the nozzle of the dry spray apparatus.

EXAMPLE 2

This exemplary formulation can be used to provide the dry components for the mortar layer (useful as a skin of a concrete article or structure): Portland cement CEM I (25 wt %); titanium dioxide anatase (1 wt %); white alumina cement (3 wt %); dried polymer emulsion (3 wt %); sand, 0-0.5 mm (68 wt %). Water (20 wt %, based upon the weight of the dry components) is added to the dry components in the nozzle of the dry spray apparatus.

EXAMPLE 3

As an exemplary method, the foregoing components described in Example 2 can be applied using dry spray apparatus nozzle against a mould or formwork to create a mortar skin within the mould and formwork, to a 1-3 mm thickness. The composition used for creating the mortar can optionally comprise admixtures chosen from water reducing admixtures, set accelerating admixtures, set retarding admixtures, water repellent admixtures, air detraining admixtures, shrinkage reducing admixtures, crack reducing admixtures, efflorescence control admixtures, colorants, pigments, dried polymer emulsions, oil repellent agents, stain resistance improvers, anti-graffiti agents, electricity conductors, $NO_x$ reducers, photochrome pigments, thermochrome pigments, UV absorbers, fluorescent optical brighteners, and mixtures of any of the foregoing. The relative amount can be based upon conventional addition rates or in accordance with the dictates of the project at hand and/or aesthetic whims of the architect or applicator. For example, water reducing admixtures can be used in combination with one or more accelerating and air detraining admixtures for strengthening the mortar, and a water repellent admixture can be used for water impermeability. Once the mortar skin has been applied into the mould or formwork, then concrete can be cast or sprayed into the mould or formwork to make the rest of the structural unit.

The mortar skin may, for example, include a colorant or pigment, and a plurality of concrete articles can be made, whereby the mortar skin has a uniform visual appearance based on the use of the colorant or pigment, even if the concrete cast against the mortar skin contains different colour or appearance, such as due to the absence of colorant or pigment.

A wall, foundation, bridge deck, or other concrete structure can be assembled using a plurality of concrete articles having the mortar skin composition as described above.

The invention claimed is:

1. A method for manufacturing a concrete article comprising:
    (a) first coating a mould or formwork with a release agent to form a coated mould or formwork;
    (b) dry spraying powder comprising cement and fine aggregates onto the coated mould or formwork, thereby forming a layer of mortar, wherein the powder components are introduced to a high velocity air stream and conveyed through pipes to a nozzle where, at the nozzle, an atomized spray of water is added to the powder components to hydrate the powder components;
    (c) casting concrete into the mould or formwork and onto the layer of mortar; and
    (d) allowing the concrete to hydrate and harden in the mould or formwork, wherein mean average thickness of the mortar layer is from 0.1 to 10 mm.

2. The method of claim 1, wherein the powder comprises:
    5 to 50 wt % of cement based upon the weight of the mortar; and
    40 to 95 wt % of fine aggregate, based upon the weight of the mortar.

3. The method of claim 1 wherein the powder further comprises an admixture chosen from water reducing admixtures, set accelerating admixtures, set retarding admixtures, water repellent admixtures, air detraining admixtures, shrinkage reducing admixtures, crack reducing admixtures, efflorescence control admixtures, colorants, pigments,, oil repellent agents, stain resistance improvers, anti-graffiti agents, electricity conductors, NOX reducers, photochrome pigments, thermochrome pigments, UV absorbers, fluorescent optical brighteners, and mixtures of any of the foregoing components.

4. The method of claim 1, wherein the powder further comprises admixtures comprising at least one water reducing admixture, at least one air detraining admixture, at least one set accelerating admixture, and at least one water repellent admixture.

5. A method comprising assembling into a structure a plurality of concrete articles made from claim 1, wherein the article is a wall, foundation, tunnel lining, deck surface, bridge deck, or mixture thereof.

6. The method of claim 1, comprising: applying a release paper having a pattern to a mould or formwork; applying a first mortar skin coating composition onto the mould or formwork having the pattern release paper; removing the pattern release paper; applying a second mortar skin coating composition to the first mortar skin coating composition on the mould or formwork surface from which the pattern release paper was removed; and applying concrete onto the first and second mortar skin coating compositions.

7. A concrete article or structure obtainable by the method according to claim 1.

8. A concrete structure obtainable by assembling concrete articles obtainable by the method according to claim 1.

9. The method of claim 1 wherein the release agent comprises at least one selected from the group consisting of a mineral oil-based release agent, and a vegetable oil-based release agent; and optionally a solvent.

10. The method of claim 9 wherein the release agent comprises an oil-in-water emulsion.

11. The method of claim 1 wherein the mean average thickness of the mortar layer is from 0.5 to 6 mm.

12. The method of claim 11 wherein the mean average thickness of the mortar layer is from 0.75 to 4 mm.

13. The method of claim 3 wherein the powder comprises a dried polymer emulsion.

14. The method of claim 13 wherein the dried polymer emulsion comprises at least one polymer selected from the group consisting of acrylic, methacrylic, carboxylic, acetic, latex, a vinyl ester of versatic acid, and styrene acrylic polymer.

15. The method of claim 14 wherein the dried polymer emulsion is present at from 0.1 to 10 wt. % based on the weight of the mortar.

16. The method of claim 15 wherein the dried polymer emulsion is present at from 0.5 to 5 wt. % based on the weight of the mortar.

17. The method of claim 15 wherein the dried polymer emulsion is present at from 0.8 to 3 wt. % based on the weight of the mortar.

\* \* \* \* \*